Figure 1A:
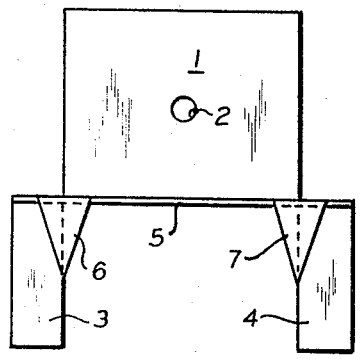

March 14, 1967 H. V. ETTORE ETAL 3,308,590
REMOVABLE PANEL FASTENER
Filed Feb. 3, 1964 2 Sheets-Sheet 1

INVENTORS
HAROLD V. ETTORE
FREDERICK R. ASHBY
BY James M. Heilman
ATTORNEY.

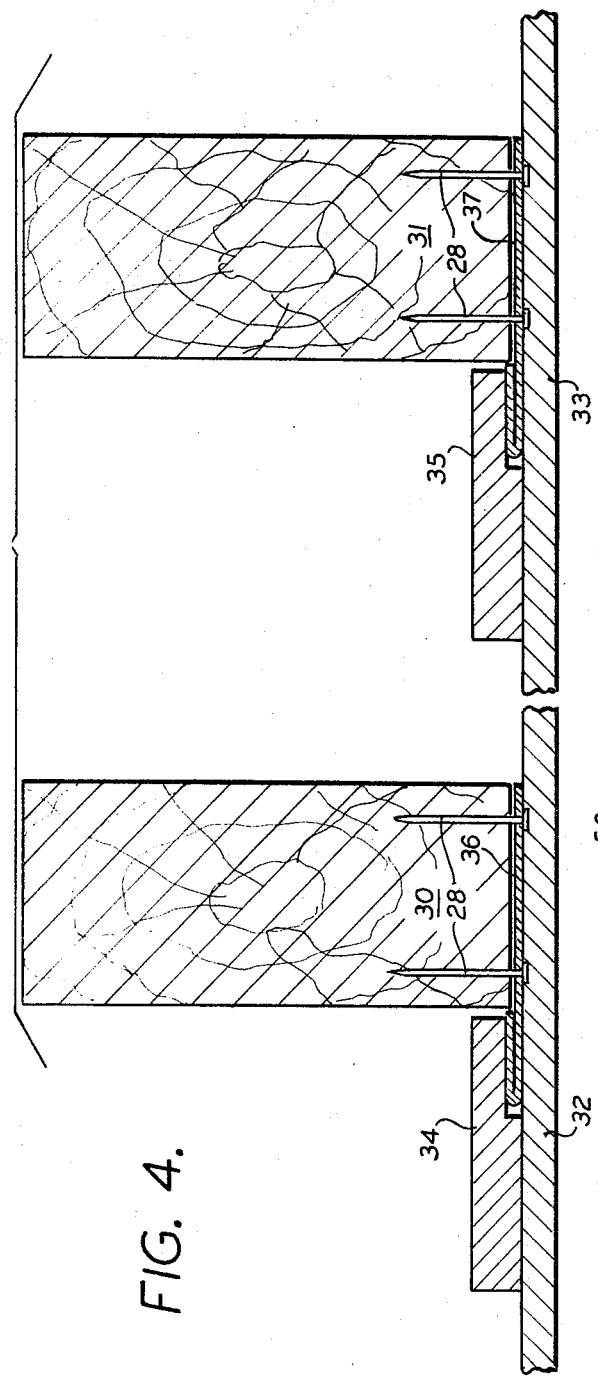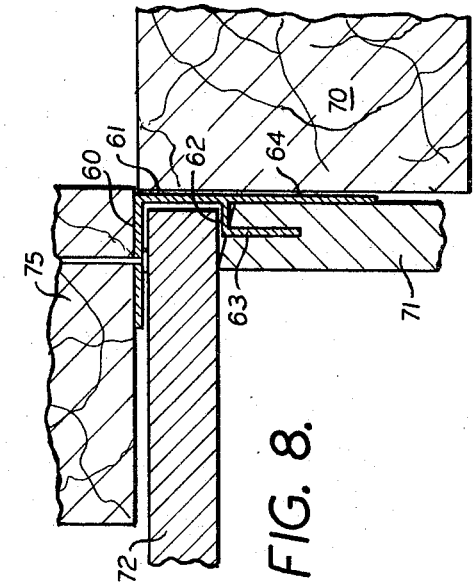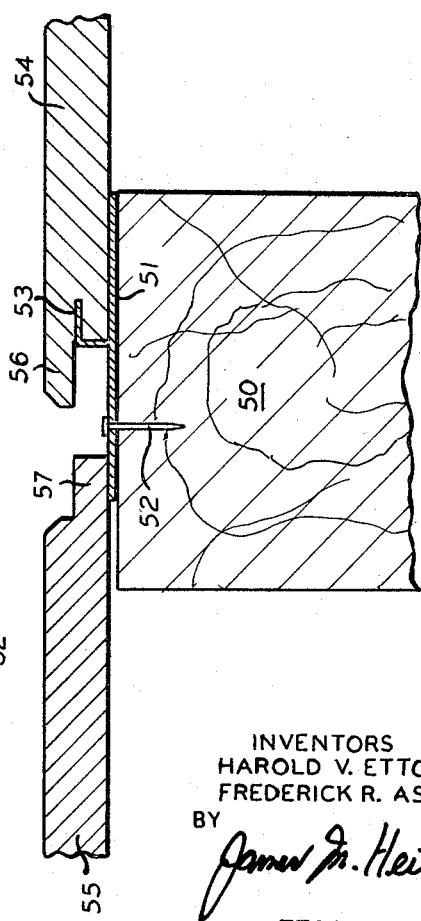

United States Patent Office 3,308,590
Patented Mar. 14, 1967

3,308,590
REMOVABLE PANEL FASTENER
Harold V. Ettore, Yorktown Heights, and Frederick R. Ashby, Carmel, N.Y., assignors to United States Plywood Corporation, New York, N.Y., a corporation of New York
Filed Feb. 3, 1964, Ser. No. 342,080
6 Claims. (Cl. 52—281)

The present invention is concerned broadly with a unique and very effective system for installing plain or textured prefinished plywood panels over a stud wall as for example where the studding is 16″, on center, thereby eliminating the need for face nailing or fastening. The present system is particularly adapted for use with plain or textured, relatively thin plywood panels such as panels of about ¼″ in thickness. Specific adaptations of the present invention are the employment of unique types of fasteners which are nailed directly to the stud and which are then used in conjunction with panels which are butt mounted or which are mounted with ship lapped edges. Another adaptation is the use of a back strap or back strip on the panel which is utilized in conjunction with a unique type of hook or fastener. Thus, the present invention is concerned with a wall structure which comprises in combination a unique and novel hook type fastener and a panel adapted to be used therewith.

As mentioned, one specific adaptation of the invention is particularly concerned with a plywood-hook fastener combination whereby plywood panels or equivalent units may be readily butt jointed or mounted to a wall with ease without showing the means by which the same are mounted. By eliminating face nailing, the warmth and the overally desirability of the decorative panelled wall is retained. Furthermore, if the panel is factory prefinished, face nailing or face attaching destroys the uniform film on the face, thereby disfiguring the same, or if the panel is not factory finished, the subsequent application of liquid finish over face nailing produces an effect which is not uniformly pleasing to the eye.

In order to attain this desired end of concealed and effective attachment of panels to a wall, various types of concealed clips and affixing means have been devised. One type, for example, was used in conjunction with panels that had slots along the longitudinal sides. The clips nailed to the studs seats in these slots. However the slotted sides tend to fracture or break away causing the loss of valuable panels, and thereby greatly increasing the cost of the erected wall. On the other hand, one type of fastener of the present invention is a clip unit which has prongs or ears which extend into the sides of the panel. These prongs are affixed to the base part of the clip which base is nailed to the stud. The next panel on the butting edge to a preceding panel has attached thereto a similar lip or clip which extends underneath the already affixed panel and the units are thus butt jointed by a very easy and effective technique. Thus the panel clips of the present invention used in conjunction with the various means to be hereinafter described will produce a very excellent and sturdy type of beautiful wall structure.

Figure 1B:
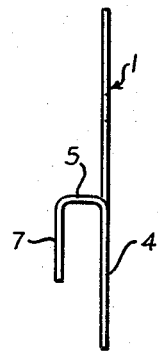
Figure 1C:
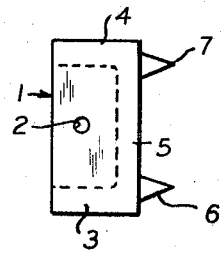
Figure 2:
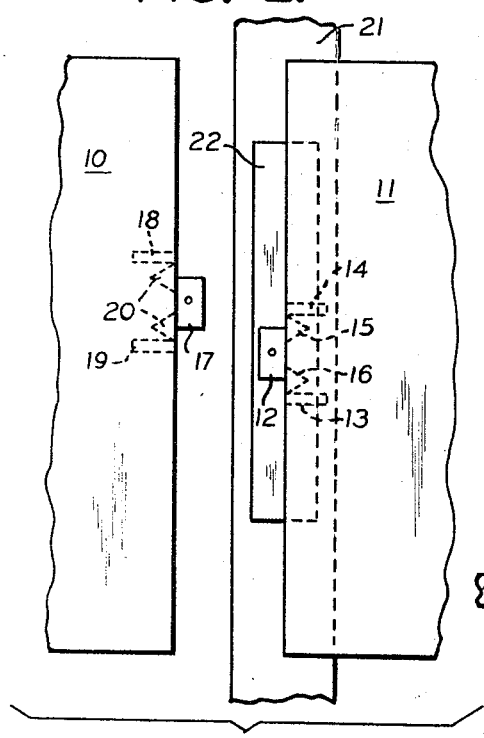
Figure 5:
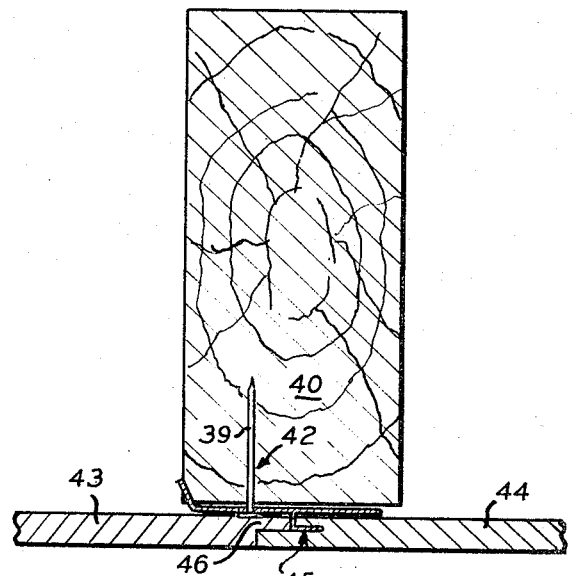
Figures 7A, 7B:
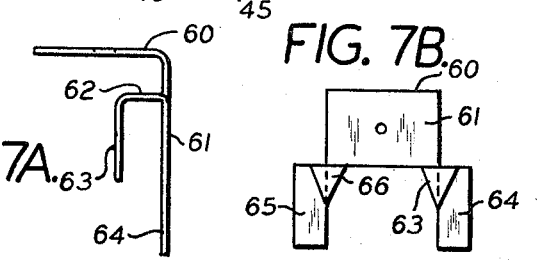
Figure 3:
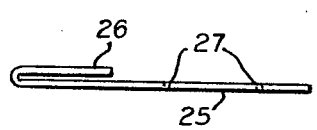

The modifications and various adaptations of the present invention may be readily understood by reference to the drawings illustrating embodiments of the same. FIGURE 1A is a top view of the unique type of clip or fastener used in one embodiment of this invention, while FIGURE 1B is a side view of the same. FIGURE 1C illustrates the one piece element from which the clip may be punched. FIGURE 2 illustrates in some detail the method by which these clips are used to fasten panels to a stud. FIGURE 3 is a view of a modifier type of clip or fastener which is used in accordance with another adaptation of the invention. FIGURE 4 illustrates the use of the clip described with respect to FIGURE 3 for affixing various panels in a butt joint mounting. FIGURE 5 illustrates the use of the clip described with respect to FIGURE 1 wherein the respective panels are mounted with ship lapped edges. FIGURE 6 is somewhat similar to FIGURE 5 in that it shows the use of a clip which is described with respect to FIGURE 1 and the mounting of panels which have ship lapped sides. FIGURE 7A describes an adaptation of the clip so as to be utilized for effective corner mounting. FIGURE 7B is a top view of the modifier clip or fastener. FIGURE 8 shows the use of the modifier clip for corner construction.

Referring specifically to FIGURE 1A, which illustrates the top view of one type of unique clip used in accordance with the present invention. This clip comprises a base section 1 containing a perforation, or hole 2, through which a nail, etc., may be passed for affixing the clip to a stud. This base section is fastened to the supporting stud or substrate by any suitable means. Extending outwardly from the base section and in the same plane, are two leg elements 3 and 4. It is to be noted that the inner sides or edges of the legs are beyond the outer edges of the base section. Thus a vertical plane will pass along the inner edge of the leg and the outer edge of the base. Extending upwardly from one edge of the base section adjacent the leg elements is a shoulder 5. This shoulder extends vertically upwardly from the plane of the base or flat surface 1 and the leg elements 3, 4. Extending outwardly from the top surface or edge of the shoulder are pointed ears or pins 6 and 7 which are inserted into the edges of the plywood panel or section to be supported. These pins are in a plane which is substantially parallel to the plane of the base section and leg elements. It is to be noted that the base section, the leg elements and the shoulder are readily punched out from a unit rectangular piece having extended ears as shown in FIGURE 1C. The type of clip or fastener is further illustrated in FIGURE 1B, a side view. Similar elements in 1B, 1C and 1A, are similarly numbered.

While the dimensions of the clip or fastener may be varied appreciably, depending upon the panel to be supported and upon other factors, a typical clip for ¼″ plywood is, for example, a base section having a width of about .875 inch and a length of about .687 inch. Under these conditions the legs would extend outwardly about .563 inch from the base. The legs have a width of about ³⁄₁₆″. The height of the shoulder 5 above the plane of base 1 is about ⅛″. Under these conditions the pins extend outwardly from the top of the shoulder 5 about .312 inch. It is to be noted that the apex of the pins are such that they are in the vertical planes of the inner sides of the leg elements. The base of the pins which are affixed to the top of the shoulder 5 are about .18 inch wide. This gives them excellent strength and stability. These pins may be of any suitable metal or material, but are preferably of a non-corrosive steel having a thickness in the range of about .016 inch. The distance from the vertical plane of the longitudinal center line of the leg element to the vertical plane of the longitudinal center line of the pin is about .188 inch.

Referring specifically to FIGURE 2, panels 10 and 11 are shown having affixed thereto a first clip which is attached to panel 11, and a second clip or fastener which is shown attached to panel 10. The base section 12 of the first clip is shown attached to stud 21. In accordance with a preferred modification, a wedge element or fir strip 22 is interposed between the base of the first clip and the stud 21. The legs 13 and 14 of the first clip are shown underneath the surface or along the back surface of panel 11, while the ears 15 and 16 bite into the edges of the panel 11. The base 17 of the second clip, which is attached to panel 10, protrudes from the side of panel 10, and the legs 18 and 19 of the second clip are also along the back surface of panel 10 while the ears 20 of the second clip bite into the sides of panel 10. It should be noted that the clip on panel 10 is positioned higher along the side of panel 11 than the first clip to avoid interference between the respective clips.

Thus, in mounting the second panel 10, so as to butt against panel 11, the surface 17 of the second clip slides underneath the back surface of panel 11 and is intermediate the wedge 22 and the back surface of panel 11. Thus FIGURE 2 illustrates a desirable technique and method of butt joining lap siding panels or narrow horizontal panels. Obviously, this method is equally applicable to 4' x 8' factory finished plywood panels, solid wood planks, or other solid decorative wall covering materials. Additionally, wedge 22 which is supplied loose may be affixed to the stud 21 of the structure if desired. The clip with the tab or base is attached to the panel after which the clip is nailed, through the wedge if used, to the stud. The clip attached to panel 10 has a tab or base 17. This tab slides under panel 11. By this means the panels are readily removable, can easily be adjusted one with respect to another and also result in a very rigid structure.

Referring specifically to FIGURE 3, a particular type of clip is shown which will be further described with respect to FIGURE 4. In essence, this clip comprises a front face section 25 and an overlapping back surface 26. The clip is affixed to a supporting member such as the stud, by means of fasteners or nails which extend through holes 27. A typical clip of this type has a front face of about 2.375 inches wide and a back surface of about .75 inch wide. The depth may vary from about ¼" to 2". The thickness of the overlapped both surfaces is about .125 inch. It is preferred that the clip comprise 16 gauge aluminum. This results in a clip of great strength and resiliency.

Referring specifically to FIGURE 4, the fasteners described in FIGURE 3, namely, 36 and 37, are affixed by nails 28 to vertical studs 30 and 31. Panels 32 and 33 having attached to their back surfaces a lock strip 34 and a lock strip 35 are then moved laterally into position in order to have panel 32 butt up against the edge of panel 33. This method of locking, i.e., where one end of fastener 36 seats in the locking strip recess which locking strip is secured to the rear of panel 32, results in a very effective type of fastening or locking assembly. Furthermore the panels may be readily dismantled by moving the panels laterally in the opposite direction. The opening or the width of the slot into which the extending end of 36 seats is such that a compressive thrust is exerted on the overlapped end. This results in excellent rigidity and stability.

Referring specifically to FIGURE 5, the clip described with respect to FIGURE 1 is shown affixed to stud 40, by means of nail 39. To this fastener 42 is affixed panel 44 wherein the extending ears of the clip extend into the side of panel 44. Panel 44 also has a shiplapped type of overlap 45 into which the shiplapped mating part of 46 of panel 43 seats. This produces a very rigid and sturdy type of wall structure.

Referring specifically to FIGURE 6, which illustrates in some further detail the type of structure shown in FIGURE 5, a clip or fastener described with respect to FIGURE 1, 51 is shown affixed to framing member or upright stud 50 by means of nail 52 or other means. The extending ears 53 of fastener 51 seat into the side of panel 54 thereby effectively securing the panel. The overextending edge of panel 54, namely 56, is adapted to receive the underextending edge 57 of panel 55. This is a vertical or top view of the respective panels showing the method by which they are readily assembled, and if necessary, readily disassembled.

Referring specifically to FIGURE 7A it is a side view of a fastener or clip similar to the clip illustrated in FIGURE 1, except that it has a second base and is adapted to be seated or affixed in a corner so as to hold the corner pieces of plywood. Thus, the base section consists of 61, with extending leg 64 and a shoulder 62 from which extends the ear 63. In accordance with this adaptation of the clip illustrated in FIGURE 1, there is a second base section 60 extending vertically upward from base section 61. FIGURE 7B is a top view of FIGURE 7A showing base section 61, extending leg elements 64 and 65, and ears or prongs 63 and 66.

Referring specifically to FIGURE 8, the clip described in FIGURE 7 is shown wherein similar parts of the clip are similarly numbered. The base section 61 of the clip is affixed to vertical extending framing member or stud 70 and the ears of the clip 63 and 66 extend into the side of panel 71. It is to be noted that the edge of panel 71 is beveled so as to permit shoulder 62 to extend upwardly and to secure a tight and pleasing connection between panels 71 and panel 72. The second base section of the clip which is vertical to base 61, namely 60, is affixed to framing member 75 as shown and is adapted to receive the side edge of panel 72 and thus produce a very rigid, effective and pleasing type of corner construction.

Thus, the present invention is broadly concerned with the development of a readily mountable or readily dismountable wall, particularly a plywood panel wall. Although it may be used in conjunction with wood panels of any thickness it is particularly uniquely adapted for use with this panel such as plywood panels of about ⅛" to ¼" thickness. As pointed out heretofore if the butt joint is face nailed or if the panel is face nailed along the edges, particularly if the panels are thin, the panel edge is usually damaged and the resulting finished appearance is not acceptable. The use of a fastener of the present eliminates these problems. Thus in accordance with the present invention, face nailing is eliminated and the finished appearance is excellent. The resulting wall or partition is strong and rigid.

Thus the fasteners may be used with panels having 90° edges, shiplapped edges, tongue-and-groove edges, grooved edges and splined edges. The fasteners may be modified to accommodate various panel thicknesses, but are preferably adapted for relatively thin thicknesses. The fastener described in FIGURES 7A and 7B are very effective for corners such as inside corners. The fasteners are very economical and give an excellent finished appearance to the set up wall or partition.

What we claim is:

1. A unique wall mounting which comprises in combination, (1) a first panel having attached thereto, (2) a first fastener, (3) a second panel having attached thereto, (4) a second fastener, said first and said second fasteners characterized by having, (5) base sections, said base sections of said first fastener being contiguous to and rigidly affixed to a framing member, said base section of said second fastener extending along the back surface of said first panel, (6) shoulder sections extending vertically from sides of said base sections and along the sides of said panels, (7) leg sections extending beyond said shoulders and in the same planes as said base sections, said leg sections of said first fastener extending along the back surface of said first panel, said leg sections of said second fastener extending along the back surface of said second panel, (8) pins extending beyond said shoulders at the tops thereof above said leg sections and in planes parallel to the planes of said leg sections whereby the pins of said first fastener will extend into the side of said first panel and whereby the pins of said second fastener will extend into the side of said second panel, whereby the shoulders of said fasteners will extend along the sides of said panels, thereby securing a butt joint between said panels on said framing member.

2. Wall mounting as defined by claim 1 wherein said first fastener is attached to the side of said first panel between the ends thereof at a point longitudinally different than the point at which said second fastener is attached to the side of said second panel between the ends thereof.

3. A wall mounting which comprises in combination, (1) a first panel having attached thereto, (2) a fastener which is characterized by, (3) a first base section contiguous to and rigidly affixed to a framing member, (4) a shoulder section extending vertically from one side of said base section, (5) leg sections extending beyond said shoulder and in the same plane with said base section and extending behind the rear surface of said first panel, (6) pins extending beyond said shoulder at the top thereof and into the side of said first panel, (7) a second base section extending vertically from one side of said first base section and in a plane parallel to the plane of said shoulder, said second base section being attached rigidly to a stud, (8) a second panel perpendicular to said first panel the one edge of which seats in the area defined by the planes of said shoulder, said second base section and the front surface of said first panel.

4. Wall mounting as defined by claim 3 wherein the edge of said first panel is bevelled to open an area between the face of said second panel and the edge of said first panel thereby permitting space for said shoulder and thereby securing an excellent joint between said panels.

5. Wall mounting as defined by claim 1 wherein said panels are relatively thin, ¼" plywood panels.

6. A fastener adapted for mounting a panel to a wall structure which is characterized by (1) a base section adapted to be affixed contiguous to said wall structure, (2) a shoulder section extending vertically from one side of said base section, (3) leg sections extending beyond said shoulder in the same plane as said base section and adapted to extend along the rear of a panel to be mounted on said wall structure, (4) sharp points extending beyond said shoulder at the top thereof above said leg sections and in a plane parallel to the plane of said leg sections, whereby said sharp points will penetrate the solid, ungrooved side of said panel and whereby said shoulder will extend along the side of said panel thereby effectively securing the same to said wall structure, and wherein (5) a second base section extends vertically from one side of said base in a plane parallel to said shoulder, whereby said base may be affixed to a stud on one side of a room and said second base affixed to a second stud on a side of a room perpendicular to said first mentioned side.

References Cited by the Examiner
UNITED STATES PATENTS

| | | | |
|---|---|---|---|
| 1,974,819 | 9/1934 | Koerner | 20—92 X |
| 2,872,712 | 2/1959 | Brown et al. | 20—92 X |
| 2,938,248 | 5/1960 | Hadary | 160—351 X |
| 3,038,276 | 6/1962 | Butler | 52—363 X |
| 3,171,232 | 3/1965 | Gretter | 52—714 |
| 3,187,389 | 6/1965 | Anderson | 20—92 X |

REINALDO P. MACHADO, *Primary Examiner.*

HARRISON R. MOSELEY, *Examiner.*

P. M. CAUN, *Assistant Examiner.*